US012781680B2

(12) United States Patent
Watanabe et al.

(10) Patent No.: US 12,781,680 B2
(45) Date of Patent: Nov. 3, 2026

(54) ENGINE SYSTEM

(71) Applicant: SUBARU CORPORATION, Tokyo (JP)

(72) Inventors: Naoya Watanabe, Tokyo (JP); Shota Tobe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/260,822

(22) Filed: Jul. 7, 2025

(65) Prior Publication Data

US 2026/0055735 A1 Feb. 26, 2026

(30) Foreign Application Priority Data

Aug. 20, 2024 (JP) ................................ 2024-139359

(51) Int. Cl.
*F02D 41/06* (2006.01)
*F02D 41/40* (2006.01)

(52) U.S. Cl.
CPC ......... *F02D 41/068* (2013.01); *F02D 41/401* (2013.01); *F02D 2200/023* (2013.01); *F02D 2200/0406* (2013.01); *F02D 2200/08* (2013.01); *F02D 2200/101* (2013.01)

(58) Field of Classification Search
CPC .... F02D 41/068; F02D 41/401; F02D 41/047; F02D 41/062; F02D 41/345; F02D 2200/023; F02D 2200/0406; F02D 2200/08; F02D 2200/101; F02D 35/023; F02D 37/02; F02D 2041/001
See application file for complete search history.

(56) References Cited

U.S. PATENT DOCUMENTS

| | | | | |
|---|---|---|---|---|
| 7,630,821 B2 * | 12/2009 | Yamashita | F02D 41/008 | 701/110 |
| 2001/0032617 A1 * | 10/2001 | Kawakami | F02D 13/0219 | 123/406.64 |
| 2009/0150048 A1 * | 6/2009 | Asada | F02D 41/009 | 701/103 |
| 2017/0254276 A1 * | 9/2017 | Sugiyama | F02M 35/10157 | |
| 2021/0140388 A1 * | 5/2021 | Kusakabe | F02B 23/08 | |

FOREIGN PATENT DOCUMENTS

| | | |
|---|---|---|
| JP | 2006-291876 A | 10/2006 |

* cited by examiner

*Primary Examiner* — George C Jin
(74) *Attorney, Agent, or Firm* — TROUTMAN PEPPER LOCKE LLP

(57) ABSTRACT

An engine system includes: an engine including a piston, cylinder, intake valve, and exhaust valve; an intake manifold introducing intake air into the engine; an intake pressure sensor detecting intake pressure; and a control device including a processor(s) and a memory(ies). A first threshold, based on the intake pressure at a first timing during rapid warm-up in the engine's initial state, is prepared. The first timing is within one cycle of the engine, after an intake valve opening timing, and before the piston reaches a bottom dead center. The processor(s) execute a process including: obtaining intake pressure at the first timing during warm-up in the engine's current state; determining whether the intake pressure is less than the first threshold; and when the intake pressure is less than the first threshold, advancing a fuel injection timing according to a pressure difference between the first threshold and the intake pressure.

5 Claims, 8 Drawing Sheets

ENGINE SYSTEM

CROSS-REFERENCE TO RELATED APPLICATIONS

The present application claims priority from Japanese Patent Application No. 2024-139359 filed on Aug. 20, 2024, the entire contents of which are hereby incorporated by reference.

BACKGROUND

The disclosure relates to an engine system.

For example, Japanese Unexamined Patent Application Publication (JP-A) No. 2006-291876 discloses a control device configured to control the fuel injection timing in an engine. In JP-A No. 2006-291876, the tumble ratio is estimated based on changes in pressure in the surge tank, and the greater the tumble ratio, the later the fuel injection timing.

SUMMARY

An aspect of the disclosure provides an engine system including an engine, an intake manifold, an intake pressure sensor, and a control device. The engine includes a piston, a cylinder, an intake valve, and an exhaust valve. The intake manifold is configured to introduce intake air into the engine. The intake pressure sensor is configured to detect intake pressure inside the intake manifold. The control device is configured to control the engine. The control device includes one or more processors, and one or more memories coupled to the one or more processors. A first threshold, determined by the intake pressure at a first timing during rapid warm-up of the engine in an initial state, is prepared in advance. The first timing is included in a period within one cycle of the engine. The period is after an intake valve opening timing that represents a timing at which the intake valve changes from a closed state to an open state, and before the piston reaches a bottom dead center. The one or more processors execute a process including: obtaining, by the intake pressure sensor, the intake pressure at the first timing during rapid warm-up of the engine in a current state; determining whether the intake pressure obtained by the intake pressure sensor is less than the first threshold; and when the intake pressure obtained by the intake pressure sensor is determined to be less than the first threshold, executing a timing advance process to relatively advance a fuel injection timing in the engine according to a pressure difference between the first threshold and the intake pressure obtained by the intake pressure sensor.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

During engine warm-up, fuel is difficult to vaporize. Therefore, it is desirable to form a rich air-fuel mixture around the spark plug to improve ignitability and to combust the air-fuel mixture. Here, if deposits accumulate on the intake valve and the intake port of the engine, part of the air introduced into the cylinder is obstructed by the deposits, reducing the flow of gas in the cylinder. It is difficult to detect changes in the flow of gas in the cylinder due to accumulation of deposits. When the flow of gas in the cylinder decreases, it may become difficult to form a rich air-fuel mixture around the spark plug during engine warm-up, which may lead to reduced ignitability.

Accordingly, it is desirable to provide an engine system capable of suppressing a reduction of ignitability.

Hereinafter, an embodiment of the disclosure will be described in detail with reference to the accompanying drawings. Specific dimensions, materials, numerical values, and the like discussed in the embodiment are merely examples for facilitating understanding of the disclosure, and do not limit the disclosure unless otherwise stated. In the present specification and the drawings, for elements having substantially the same functions and configurations, overlapping descriptions are omitted by denoting them by the same reference symbols, and elements not directly related to the disclosure are omitted from the illustrations.

Figure 1:
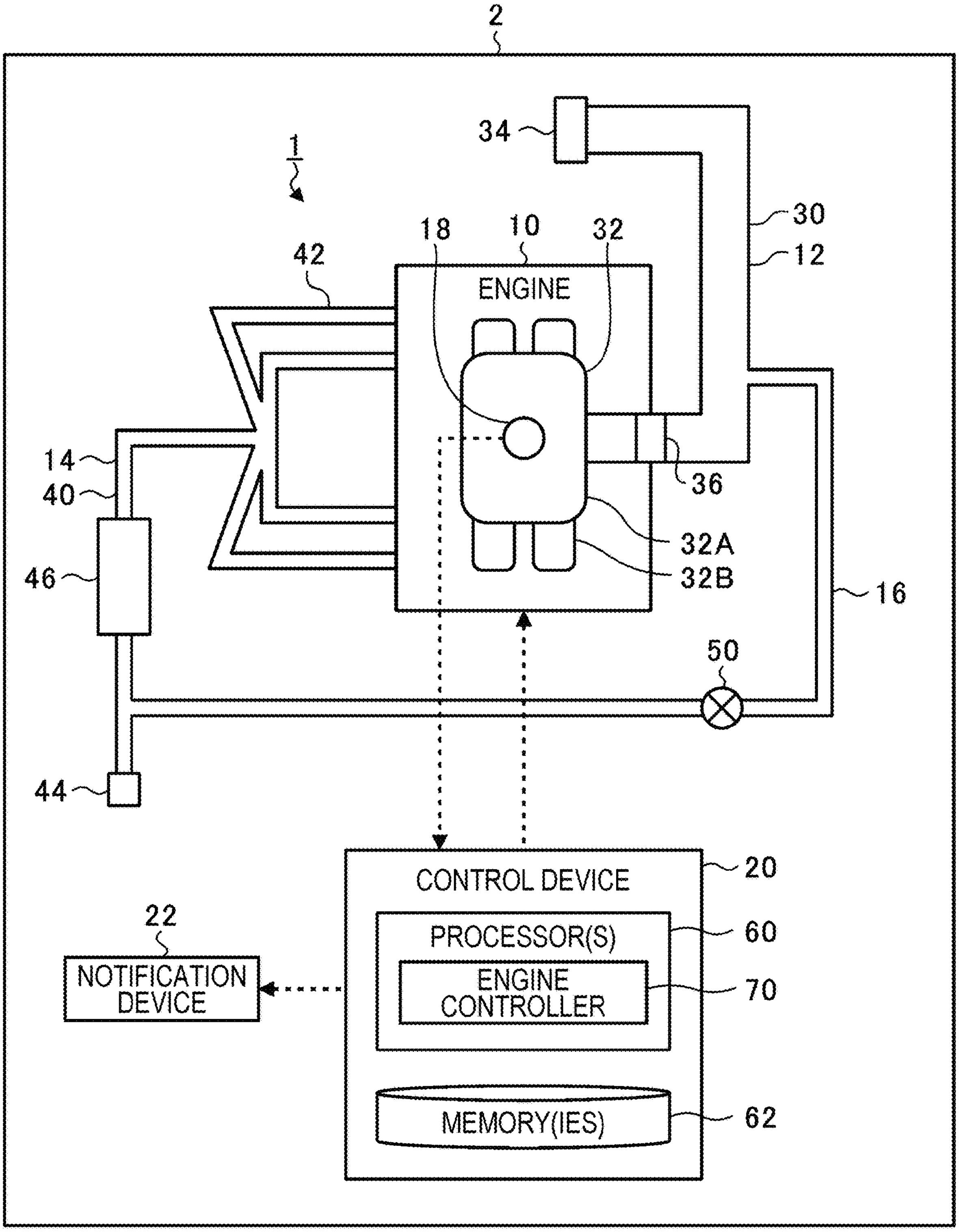
FIG. 1 is a schematic diagram illustrating an example of the configuration of an engine system according to an embodiment.

FIG. 1 is a schematic diagram illustrating an example of the configuration of an engine system 1 according to the present embodiment. The engine system 1 is mounted on a vehicle 2, for example. The engine system 1 includes an engine 10, an intake passage 12, an exhaust passage 14, an exhaust gas recirculation (EGR) passage 16, an intake pressure sensor 18 (manifold absolute pressure sensor: MAPS) 18, a control device 20, and a notification device 22.

The engine 10 is a reciprocating engine, for example, and generates a driving force by combustion of a mixture containing fuel and air. The generated driving force is transmitted to the wheels of the vehicle 2, for example. The engine 10 may include multiple cylinders, as in a four-cylinder engine, for example.

The intake passage 12 includes an intake duct 30 and an intake manifold 32. An intake opening 34 is provided at one of two ends of the intake duct 30. The other end of the intake duct 30 is coupled to the intake manifold 32. The intake manifold 32 has multiple branch sections 32B extending from a base end section 32A coupled to the intake duct 30. The multiple branch sections 32B of the intake manifold 32 are coupled to the intake ports of the individual cylinders of the engine 10.

Air is introduced into the intake duct 30 through the intake opening 34. The air introduced into the intake duct 30 is sent to the intake manifold 32. The intake manifold 32 introduces the air supplied through the intake duct 30 into the engine 10. For convenience of explanation, the air introduced into the engine 10 may be referred to as intake air.

The intake duct 30 is provided with a throttle valve 36. The throttle valve 36 is capable of adjusting the amount of air supplied to the engine 10 through the intake passage 12.

The exhaust passage 14 includes an exhaust duct 40 and an exhaust manifold 42. An exhaust opening 44 is provided at one of two ends of the exhaust duct 40. The other end of the exhaust duct 40 is coupled to the exhaust manifold 42. The exhaust manifold 42 is coupled to the exhaust ports of the individual cylinders of the engine 10.

The engine 10 discharges the gases generated by the combustion of the air-fuel mixture as exhaust gas into the exhaust manifold 42. The exhaust manifold 42 sends the exhaust gas discharged from the engine 10 to the exhaust duct 40.

The exhaust duct 40 is provided with a purification device 46 capable of purifying the exhaust gas. The exhaust gas purified by the purification device 46 is discharged to the outside through the exhaust opening 44.

One of two ends of the EGR passage 16 is coupled to the exhaust duct 40 of the exhaust passage 14. The other end of the EGR passage 16 is coupled to the intake duct 30 of the intake passage 12. The EGR passage 16 recirculates part of the exhaust gas from the engine 10 back to the intake side of the engine 10.

The EGR passage 16 is provided with an EGR valve 50. The EGR valve 50 is capable of opening and closing the EGR passage 16.

The intake pressure sensor 18 is provided in the intake manifold 32. For example, the intake pressure sensor 18 may be provided in the base end section 32A of the intake manifold 32. The intake pressure sensor 18 detects the pressure of the intake air inside the intake manifold 32. For the convenience of explanation, the pressure of the intake air may be referred to as intake pressure.

The control device 20 has one or more processors 60 and one or more memories 62 coupled to the processor(s) 60. The memory(ies) 62 include a ROM in which a program and the like are stored and a RAM as a work area. The memory (ies) 62 may include a storage in which a program and the like are stored. The processor(s) 60 cooperate with the program included in the memory(ies) 62 to control the entirety of the vehicle 2.

For example, the processor(s) 60 execute the program, thereby serving as an engine controller 70 configured to control the engine 10. The engine controller 70 can control the state of the engine 10, such as starting, operation, and stopping, as well as the engine speed. The engine controller 70 will be described in detail later.

The notification device 22 is, for example, a malfunction indicator lamp (MIL) or similar device that can report malfunction or the like. Note that the notification device 22 is not limited to a malfunction indicator lamp; it may also be various types of display devices capable of displaying the details of the malfunction, or audio output devices capable of reporting the details of the malfunction through sound.

Figure 2:
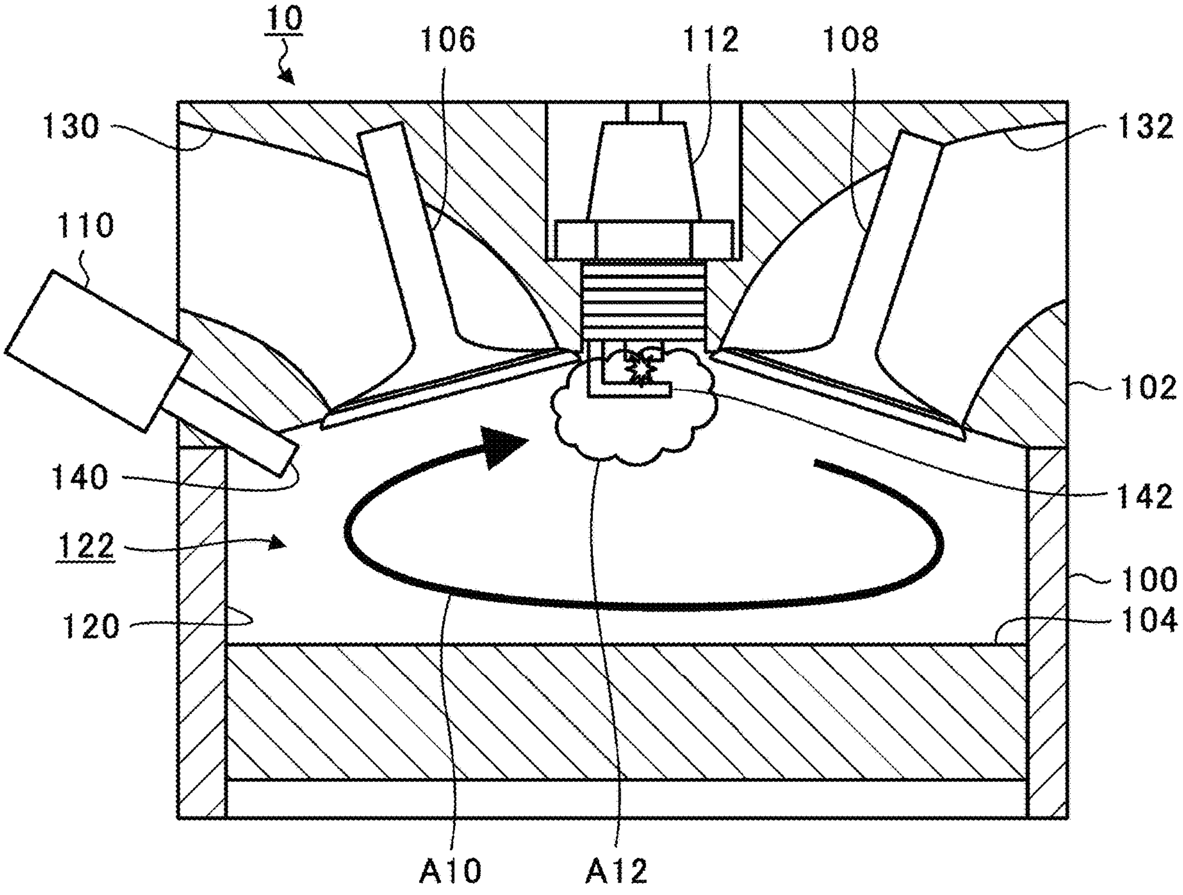
FIG. 2 is a partial cross-sectional view illustrating an example of the configuration of an engine according to the embodiment.

FIG. 2 is a partial cross-sectional view illustrating an example of the configuration of the engine 10 according to the present embodiment. The engine 10 has a cylinder block 100, a cylinder head 102, a piston 104, an intake valve 106, an exhaust valve 108, an injector 110, and a spark plug 112.

The cylinder block 100 is formed with a cylinder 120. The cylinder head 102 is coupled to the cylinder block 100 to cover the cylinder 120. The piston 104 is slidably accommodated within the cylinder 120. The space enclosed by the cylinder 120, the cylinder head 102, and the piston 104 is a combustion chamber 122.

The cylinder block 100 is formed with an intake port 130 and an exhaust port 132. The intake port 130 is coupled to the intake manifold 32. The exhaust port 132 is coupled to the exhaust manifold 42.

The intake valve 106 is provided in the intake port 130. The intake valve 106 is capable of opening and closing an end of the intake port 130 on the combustion chamber 122 side. The exhaust valve 108 is provided in the exhaust port 132. The exhaust valve 108 is capable of opening and closing an end of the exhaust port 132 on the combustion chamber 122 side.

The injector 110 is disposed with its nozzle 140 directed toward the combustion chamber 122. The nozzle 140 of the injector 110 is located opposite the exhaust valve 108 relative to the intake valve 106, for example. The injector 110 is capable of injecting fuel into the combustion chamber 122 through the nozzle 140.

The spark plug 112 is disposed so that an electrode 142 is exposed to the combustion chamber 122. The electrode 142 of the spark plug 112 is located between the intake valve 106 and the exhaust valve 108, for example. The spark plug 112 is capable of igniting the air-fuel mixture in the combustion chamber 122 by discharging at the electrode 142.

Next, the operation of the engine 10 during the warm-up of the engine 10 will be described. During the warm-up of the engine 10, the temperature of the engine 10 is still relatively low, making it difficult for the fuel to vaporize when injected by the injector 110. Accordingly, the fuel injected by the injector 110 tends to be present concentratedly in a partial area of the combustion chamber 122, leading to an uneven concentration of the air-fuel mixture in the combustion chamber 122.

During the warm-up of the engine 10, when the intake valve 106 is opened and intake air is introduced into the combustion chamber 122, gas flow occurs in the cylinder 120, as indicated by arrow A10 in FIG. 2.

Area A12 in FIG. 2 indicates an example of an area in which the fuel injected by the injector 110 is concentratedly present, i.e., an area where the concentration of the air-fuel mixture is high. As illustrated in FIG. 2, the flow of gas in the cylinder 120 directs the highly concentrated air-fuel mixture toward the vicinity of the electrode 142 of the spark plug 112. Accordingly, the spark plug 112 ignites the highly concentrated air-fuel mixture, making it possible to maintain ignitability even during the warm-up of the engine 10.

Here, if deposits accumulate on the intake valve 106 and the intake port 130, part of the air introduced into the cylinder 120 is obstructed by the deposits, reducing the flow rate of the air flowing into the cylinder 120. That is, if deposits accumulate, the flow rate of gas in the cylinder 120 decreases.

Figure 3:
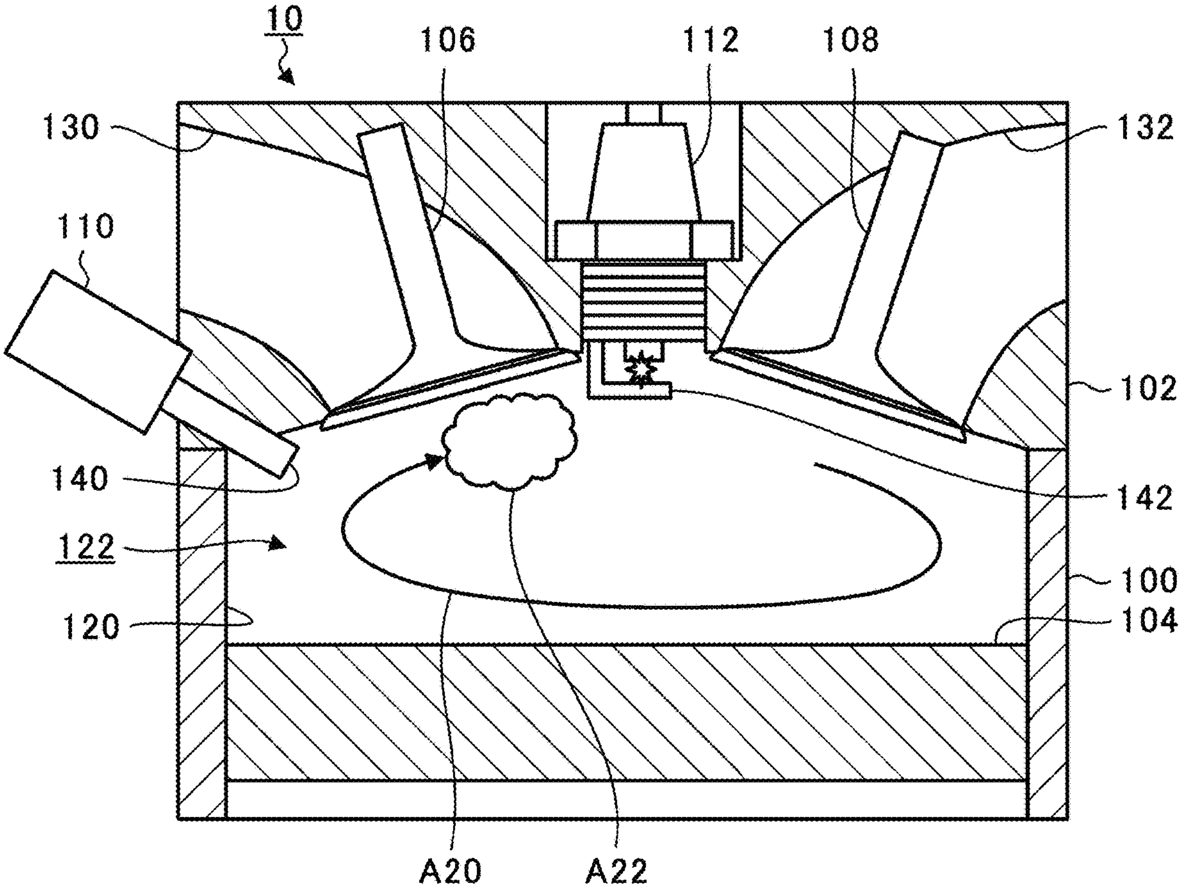
FIG. 3 is a partial cross-sectional view illustrating an example of the operation of the engine during warm-up when the flow of gas in the cylinder according to the embodiment is reduced.

FIG. 3 is a partial cross-sectional view illustrating an example of the operation of the engine 10 during warm-up when the flow of gas in the cylinder 120 according to the present embodiment is reduced. Arrow A20 in FIG. 3 indicates an example of the flow of gas in the cylinder 120 when deposits cause the flow of gas in the cylinder 120 to decrease. Area A22 in FIG. 3 indicates an example of an area in which the fuel injected by the injector 110 is concentratedly present, i.e., an area where the concentration of the air-fuel mixture is high.

As the flow of gas in the cylinder 120 decreases, the force moving the air-fuel mixture by the gas flow weakens, increasing the time for the highly concentrated air-fuel mixture to reach the vicinity of the electrode 142 of the spark plug 112. Then, as illustrated in FIG. 3, before the spark plug 112 ignites, it becomes more difficult for the highly concentrated air-fuel mixture to reach the vicinity of the electrode 142 of the spark plug 112. As a result, if deposits cause the flow of gas in the cylinder 120 to decrease, ignitability may be reduced during the warm-up of the engine 10.

As described above, as the flow of gas in the cylinder 120 decreases, it takes a longer time for the highly concentrated air-fuel mixture to reach the vicinity of the electrode 142 of the spark plug 112. In light of this, when the flow of gas in the cylinder 120 decreases, a possible solution is to relatively advance the fuel injection timing compared to before the flow of gas in the cylinder 120 decreases. That is, by advancing the fuel injection timing, the time for the highly concentrated air-fuel mixture to reach the vicinity of the electrode 142 of the spark plug 112 is ensured, allowing the highly concentrated air-fuel mixture to reach the vicinity of the electrode 142 of the spark plug 112 before ignition occurs.

However, it is difficult to directly detect the occurrence of a reduction in the flow of gas in the cylinder 120 caused by deposits.

For example, the flow rate of air flowing into the cylinder 120 can be detected if both the pressure (intake pressure) in the intake manifold 32 and the pressure in the cylinder 120 can be measured. However, measuring the pressure in the cylinder 120 across all cylinders of the engine 10 is not practical due to the durability and cost of the sensors for implementing this.

From this perspective, it is difficult to detect the occurrence of a reduction in the flow of gas in the cylinder 120 caused by deposits, and it is also difficult to decide whether to take measures to relatively advance the fuel injection timing, for example.

Accordingly, in the engine system 1 of the present embodiment, a first threshold, determined by the intake pressure at a first timing during rapid warm-up of the engine 10 in its initial state, is prepared in advance. The first timing will be described in detail later. During the rapid warm-up of the engine 10 in its current state, the engine controller 70 obtains the intake pressure at the first timing using the intake pressure sensor 18. The engine controller 70 determines whether the intake pressure obtained by the intake pressure sensor 18 is less than the first threshold. If the engine controller 70 determines that the intake pressure obtained by the intake pressure sensor 18 is less than the first threshold, it executes a timing advance process to relatively advance the fuel injection timing in the engine 10 according to the pressure difference between the first threshold and the intake pressure obtained by the intake pressure sensor 18.

Rapid warm-up refers to warming up the engine 10 by idling the engine 10 at an engine speed higher than the engine speed of the normal idling engine. Rapid warm-up is also referred to as fast idling.

Figure 4:
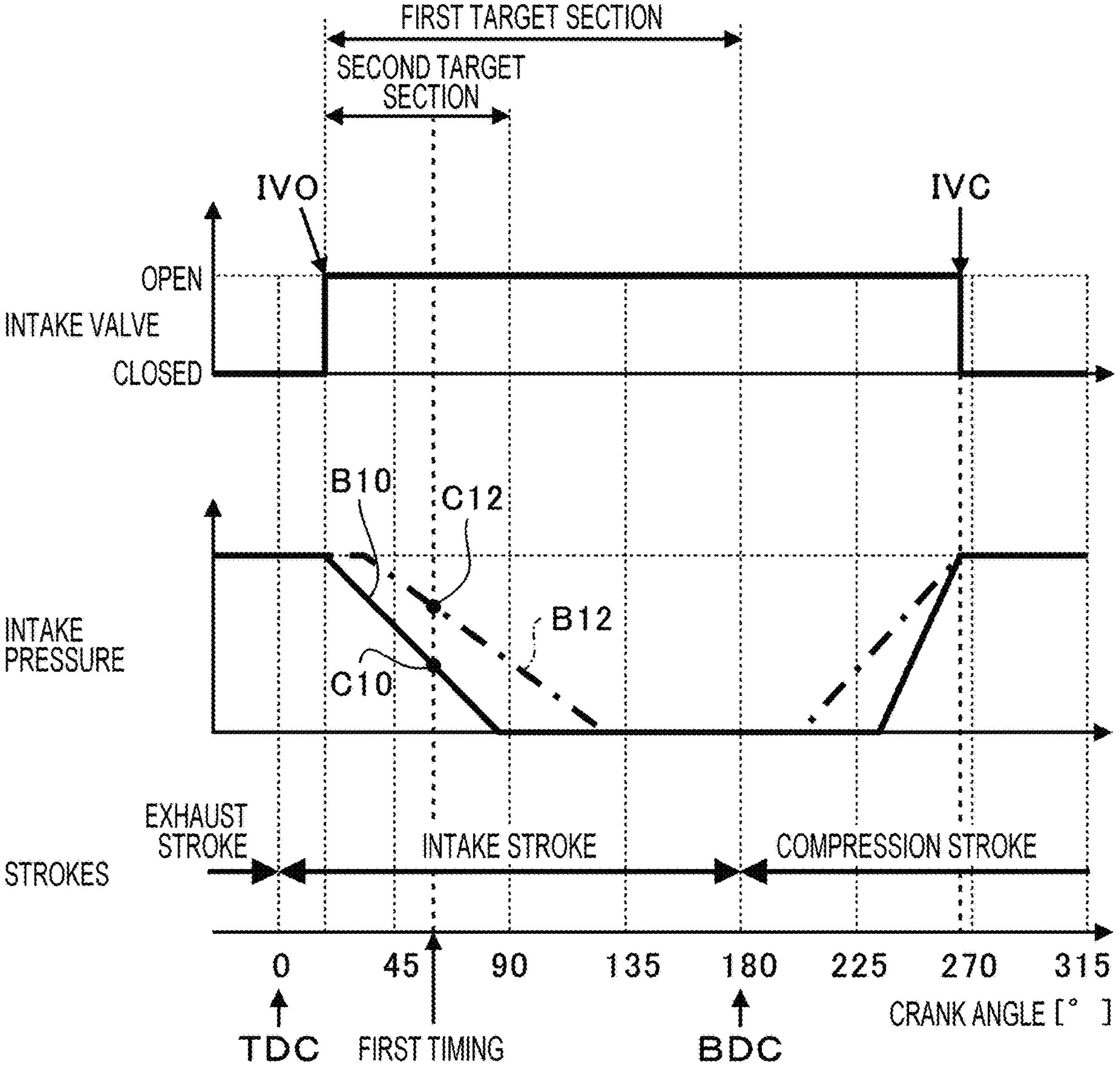
FIG. 4 is an explanatory diagram illustrating a first timing according to the embodiment.

FIG. 4 is an explanatory diagram illustrating the first timing according to the present embodiment. As illustrated in FIG. 4, during the intake stroke of the engine 10, the piston 104 moves from the top dead center (TDC) at a crank angle of "0°" to the bottom dead center (BDC) at a crank angle of "180°".

As illustrated in FIG. 4, "IVO" refers to the intake valve opening timing, which represents the timing at which the intake valve 106 transitions from the closed state to the open state. "IVC" refers to the intake valve closing timing, which represents the timing at which the intake valve 106 changes from the open state to the closed state. For example, "IVO" may be set to a crank angle of approximately "150". For example, "IVC" may be set to a crank angle of approximately "270°".

Solid line B10 in FIG. 4 indicates an example of the transition of the intake pressure in the intake manifold 32 in the engine 10 in its initial state (e.g., brand new), where no deposits have accumulated on the intake valve 106 and so forth. One-dot chain line B12 in FIG. 4 indicates an example of the transition of the intake pressure in the intake manifold 32 in the engine 10 in its current state (e.g., a state where deposits have accumulated on the intake valve 106 and so forth).

The intake pressure in the engine 10 in its initial state starts to decrease from the timing of "IVO" and reaches its minimum near a crank angle of "90°", for example. A crank angle of "90°" is the midpoint between the top dead center and the bottom dead center of the piston 104 when the piston 104 moves toward the bottom dead center during the intake stroke within one cycle of the engine 10.

On the other hand, in the engine 10 in its current state, deposits act as a resistance to air flowing into the cylinder 120. Thus, as indicated by one-dot chain line B12, in the engine 10 in its current state, compared to the engine 10 in its initial state, the start of intake pressure reduction is delayed, and the rate of reduction in intake pressure is slower.

Then, at the time point represented as "first timing" after "IVO" in FIG. 4, a difference occurs between the intake pressure in the engine 10 in its initial state (point C10 in FIG. 4) and the intake pressure in the engine 10 in its current state (point C12 in FIG. 4). By utilizing the occurrence of such a difference, in the engine system 1 of the present embodiment, the accumulation of deposits is detected, and a determination is made whether to execute a fuel injection timing advance process.

For convenience of explanation, the period within one cycle of the engine 10, after the intake valve opening timing "IVO", and before the piston 104 reaches the bottom dead center "BDC" may sometimes be referred to as a first target section.

The first timing is included in the first target section. Since a reduction in intake pressure begins after "IVO", a difference in intake pressure can occur after "IVO". Additionally, the end point of the first target section is the end point of the intake stroke, and the first target section is included in the intake stroke.

As described above, in the engine system 1 of the present embodiment, since the first timing is included in the first target section, a difference in intake pressure in the intake manifold 32 can be appropriately detected.

Additionally, for convenience of explanation, the period within one cycle of the engine 10, after the intake valve opening timing "IVO", and before the piston 104 reaches the midpoint (e.g., a crank angle of "90°") between the top dead center and the bottom dead center when the piston 104 moves toward the bottom dead center "BDC" may sometimes be referred to as a second target section.

It is more preferable for the first timing to be included in the second target section. After "IVO", a difference in intake pressure can occur. The first target section is included in the intake stroke. Additionally, the end point of the second target section is the midpoint of the intake stroke. In the intake stroke, the amount of air flowing into the cylinder 120 is greater in the first half of the stroke relative to the midpoint than in the second half relative to the midpoint. Therefore, a difference in intake pressure is more likely to occur in the first half of the stroke relative to the midpoint.

As described above, in the engine system 1 of the present embodiment, since the first timing is included in the second target section, a difference in intake pressure in the intake manifold 32 can be more appropriately detected.

As described above, in the engine system 1 of the present embodiment, the first threshold, determined by the intake pressure at the first timing during rapid warm-up of the engine 10 in its initial state, is prepared in advance. The first threshold may be stored in advance in the memory 62 of the engine 10.

The first threshold may be substantially identical to the intake pressure at the first timing during rapid warm-up of the engine in its initial state. Additionally, the first threshold may be a value that is smaller by a predetermined amount than the intake pressure at the first timing during rapid warm-up of the engine 10 in its initial state. The predetermined value here may, for example, be set considering a tolerance.

The intake pressure at the first timing during rapid warm-up of the engine 10 in its initial state may be, for example, identified through experiments or simulations using a representative engine 10 in its initial state.

The first threshold may be prepared for each speed of the engine 10. For example, the first threshold may be stored in the memory 62 as a first threshold table, where the speed of the engine 10 and the first threshold are associated.

Figure 5:
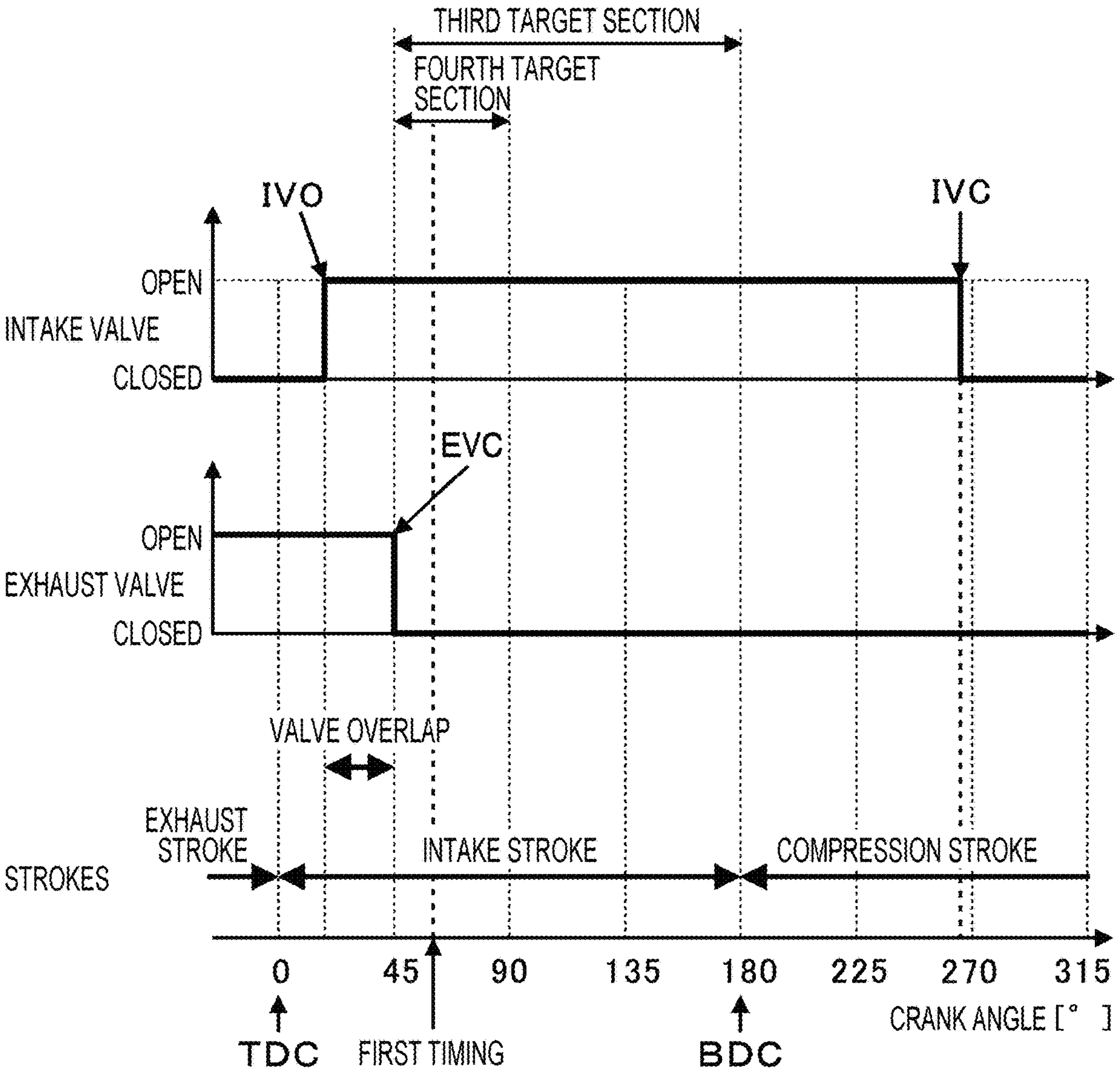
FIG. 5 is an explanatory diagram illustrating a modification of the first timing according to the embodiment.

FIG. 5 is an explanatory diagram illustrating a modification of the first timing according to the present embodiment. As illustrated in FIG. 5, "EVC" refers to the exhaust valve closing timing, which represents the timing at which the exhaust valve 108 transitions from the open state to the closed state.

In the example of FIG. 5, the intake valve 106 transitions to the open state before the exhaust valve 108 transitions to the closed state. That is, in the example of FIG. 5, it is controlled to include a valve overlap section in which both the intake valve 106 and the exhaust valve 108 are in the open state within one cycle of the engine 10.

For convenience of explanation, when valve overlap is performed, the period within one cycle of the engine 10, after the intake valve opening timing "IVO", after the exhaust valve closing timing "EVC", and before the piston 104 reaches the bottom dead center "BDC" may sometimes be referred to as a third target section.

When valve overlap is performed during rapid warm-up, the first timing is included in the third target section. When valve overlap is performed, even after "IVO", if it is before "EVC", backflow occurs in which part of the gas in the cylinder 120 flows out toward the intake manifold 32. When such backflow occurs, the intake pressure in the intake manifold 32 may deviate from a desired value. Therefore, when valve overlap is performed, the first timing is set to be included in the third target section excluding the section from "IVO" to "EVC".

As described above, in the engine system 1 of the present embodiment, when valve overlap is performed, the first timing is included in the third target section, making it possible to appropriately detect the difference in intake pressure in the intake manifold 32.

Additionally, for convenience of explanation, when valve overlap is performed, the period within one cycle of the engine 10, after the intake valve opening timing "IVO", after the exhaust valve closing timing "EVC", and before the piston 104 reaches the midpoint (e.g., a crank angle of "90°") between the top dead center and the bottom dead center when the piston 104 moves toward the bottom dead center "BDC" may sometimes be referred to as a fourth target section.

When valve overlap is performed during rapid warm-up, it is preferable for the first timing to be included in the fourth target section. The point that the start point of the fourth target section is set to "EVC" is substantially identical to setting the start point of the third target section to "EVC". Additionally, the point that the end point of the fourth target section is set to the "midpoint between the top dead center and the bottom dead center" is substantially identical to setting the end point of the second target section to the "midpoint between the top dead center and the bottom dead center".

As described above, in the engine system 1 of the present embodiment, when valve overlap is performed, the first timing is included in the fourth target section, making it possible to more appropriately detect the difference in intake pressure in the intake manifold 32.

Figure 6:
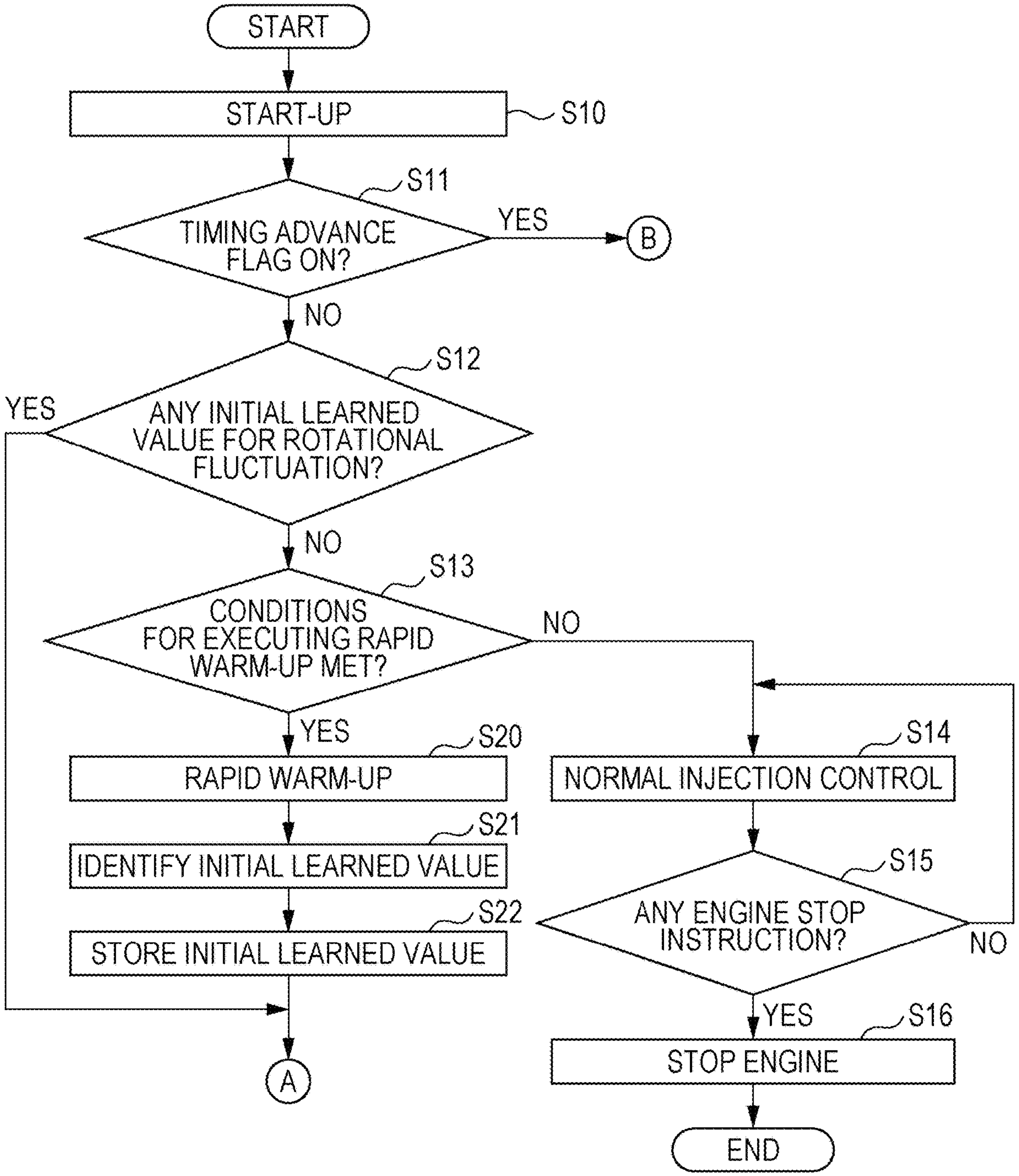
FIG. 6 is a flowchart illustrating the flow of the operation of an engine controller according to the embodiment.
Figure 7:
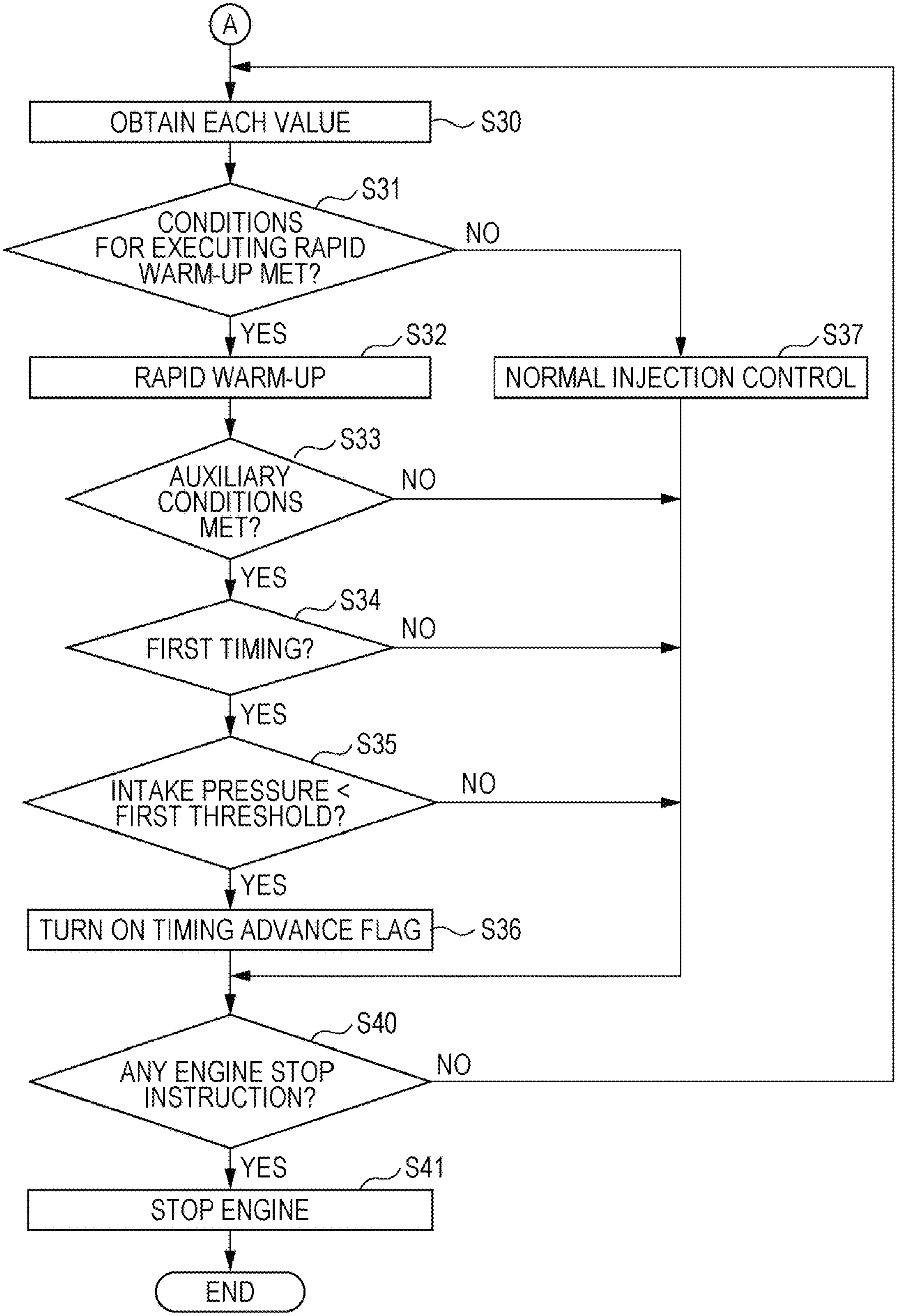
FIG. 7 is a flowchart illustrating the flow of the operation of the engine controller according to the embodiment.
Figure 8:
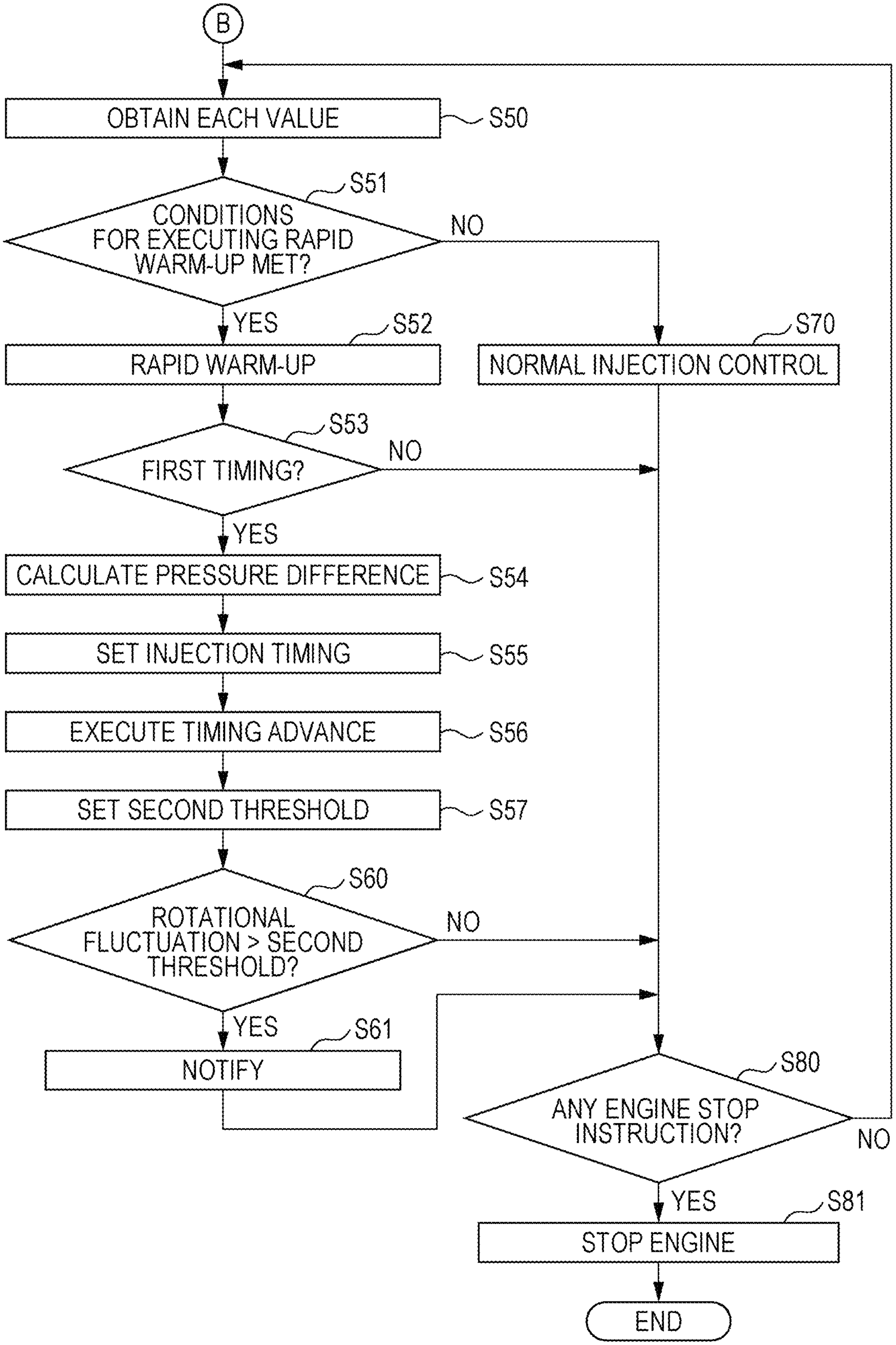
FIG. 8 is a flowchart illustrating the flow of the operation of the engine controller according to the embodiment.

FIGS. 6, 7 and 8 are flowcharts illustrating the flow of the operation of the engine controller 70 according to the present embodiment. "A" in FIG. 6 leads to "A" in FIG. 7. "B" in FIG. 6 leads to "B" in FIG. 8.

As illustrated in FIG. 6, when the starting conditions of the engine 10 are met, the engine controller 70 starts the engine 10 (S10). After starting the engine 10, the engine controller 70 determines whether a timing advance flag is on (S11). The timing advance flag is an indicator used to determine whether to execute the fuel injection timing advance process. When the timing advance flag is on, the fuel injection timing advance process is performed, as described below. The timing advance process is a process that advances the fuel injection timing in the engine 10 relative to the normal injection control.

When it is determined that the timing advance flag is on (YES in S11), the engine controller 70 proceeds to the process of "B" in FIG. 8.

When it is determined that the timing advance flag is off (NO in S11), the engine controller 70 determines whether the initial learned value for the rotational fluctuation of the engine 10 is stored in the memory 62 (S12). The rotational fluctuation of the engine 10 is an indicator indicating the deviation of the actual speed of the engine 10 from its target speed. The rotational fluctuation of the engine 10 varies from one engine 10 to another. Therefore, as will be described later, the rotational fluctuation of the engine in its initial state is learned for each individual engine.

If it is determined that the initial learned value for the rotational fluctuation is already present (YES in S12), the engine controller 70 proceeds to "A" in FIG. 7.

If it is determined that the initial learned value for the rotational fluctuation has not yet been stored (NO in S12), the engine controller 70 determines whether the conditions for executing rapid warm-up are met at this startup (S13). For example, the engine controller 70 may determine that the conditions for rapid warm-up are met when the engine at startup is in a cold state.

If it is determined that the conditions for executing rapid warm-up are not met (NO in S13), the engine controller 70 performs normal fuel injection control (S14). In this case, no rapid warm-up is performed, and normal fuel injection according to the target speed is performed.

As long as no engine stop instruction is received (NO in S15), the engine controller 70 continues normal injection control (S14). Upon receiving an engine stop instruction (YES in S15), the engine controller 70 stops the engine 10 (S16) and terminates the current engine control.

On the other hand, if it is determined that the conditions for executing rapid warm-up are met (YES in S13), the engine controller 70 executes rapid warm-up (S20). That is, the engine 10 is warmed up by idling at a relatively high engine speed.

When rapid warm-up is performed (S20), the engine controller 70 identifies the rotational fluctuation of the engine 10 during rapid warm-up as the initial learned value (S21). For example, the engine controller 70 may calculate the rotational fluctuation based on the target speed and the actual speed at each of multiple time points during rapid warm-up, and comprehensively evaluate the rotational fluctuation at each time point to identify the initial learned value.

The engine controller 70 stores the identified initial learned value in the memory 62 (S22), and proceeds to "A" in FIG. 7. Accordingly, at the next engine startup, it will be determined in the processing in step S12 that the initial learned value for the rotational fluctuation is already present.

The engine 10 in its initial state (e.g., brand new) is started, for example, during an inspection at the time of manufacturing of the vehicle 2. Therefore, the identification and storage of the initial learned value are performed for each individual engine 10 in its substantially initial state (e.g., brand new).

Note that the conditions for executing identification and storage of the initial learned value are not limited to the conditions for rapid warm-up, and various conditions may be added, in addition to the conditions for rapid warm-up.

When the engine controller 70 proceeds to "A" in FIG. 7, it obtains various data related to the engine 10 (S30). For example, the engine controller 70 may obtain values such as the value detected by the intake pressure sensor 18 of the intake manifold 32. Note that the obtained data is not limited to the detected value of the intake pressure sensor 18 and may be various data that can be utilized in post processing and the like.

Next, the engine controller 70 determines whether the conditions for executing rapid warm-up are met at this startup (S31). For example, the engine controller 70 may determine that the conditions for rapid warm-up are met when the engine 10 at startup is in a cold state.

If it is determined that the conditions for executing rapid warm-up are met (YES in S31), the engine controller 70 executes rapid warm-up (S32). That is, the engine 10 is warmed up by idling at a relatively high engine speed.

When rapid warm-up is performed (S32), the engine controller 70 determines whether predetermined auxiliary conditions are met (S33).

The predetermined auxiliary conditions may include any one or more of the following: (1) a first auxiliary condition, (2) a second auxiliary condition, (3) a third auxiliary condition, and (4) a fourth auxiliary condition.

(1) The first auxiliary condition includes the condition that fuel cut control is currently being executed in the engine 10. Fuel cut control is a control that, for example, performs no fuel injection when traveling downhill with an accelerator operation amount of "0".

(2) The second auxiliary condition includes the condition that the water temperature of the engine 10 is greater than or equal to a predetermined temperature. The predetermined temperature may be set to, for example, 90° C. or the like.

(3) The third auxiliary condition includes the condition that the speed of the engine 10 is within a predetermined range. The predetermined range may be set to, for example, 1200 rpm to 2400 rpm or the like.

(4) The fourth auxiliary condition includes the condition that the EGR valve 50 capable of opening and closing the EGR passage 16 is in the closed state. That is, the fourth auxiliary condition includes the condition that part of the exhaust gas from the engine 10 is not recirculated back to the intake side of the engine 10.

If it is determined that the auxiliary conditions are not met (NO in S33), the engine controller 70 proceeds to the processing in step S40.

If it is determined that the auxiliary conditions are met (YES in S33), the engine controller 70 determines whether the current time point is substantially the first timing (S34). Note that being substantially the first timing is not limited to a case where the current time point exactly matches the first timing; it may also include a case where the current time point is close to the first timing within a predetermined tolerance range.

If it is determined that the current time point is not substantially the first timing (NO in S34), the engine controller 70 proceeds to the processing in step S40.

If it is determined that the current time point is substantially the first timing (YES in S34), the engine controller 70 determines whether the intake pressure obtained by the intake pressure sensor 18 in step S30 is less than the first threshold (S35). Since the current time point is determined to be the first timing, the intake pressure obtained by the intake pressure sensor 18 in step S30 is substantially the intake pressure obtained by the intake pressure sensor 18 at the first timing.

For example, the engine controller 70 refers to the current engine speed obtained in step S30 and the first threshold table stored in the memory 62, and reads the first threshold corresponding to the current engine speed obtained in step S30. The engine controller 70 may compare the intake pressure obtained by the intake pressure sensor 18 in step S30 with the read first threshold.

If it is determined that the intake pressure obtained by the intake pressure sensor 18 is greater than or equal to the first threshold (NO in S35), the engine controller 70 proceeds to the processing in step S40.

If it is determined that the intake pressure obtained by the intake pressure sensor 18 is less than the first threshold (YES in S35), the engine controller 70 turns the timing advance flag on (S36), as it can be inferred that the flow in the cylinder has decreased due to deposits on the intake valve and the like. By turning on the timing advance flag, it becomes possible to execute the fuel injection timing advance process at the next engine startup. After the timing advance flag is turned on, the engine controller 70 proceeds to the processing in step S40.

Additionally, if it is determined in step S31 that the conditions for executing rapid warm-up are not met (NO in S31), the engine controller 70 performs normal injection control (S37) and proceeds to the processing in step S40. In this case, no rapid warm-up is performed, and normal fuel injection according to the target speed is performed.

In step S40, if the engine controller 70 has received no engine stop instruction (NO in S40), it returns to the processing in S30 and repeats the processing.

Upon receiving an engine stop instruction (YES in S40), the engine controller 70 stops the engine 10 (S41) and terminates the current engine control.

Note that, in the above description, the timing advance flag is turned on (S36) if it is determined that the auxiliary conditions are met (YES in S33) and the intake pressure obtained by the intake pressure sensor 18 is determined to be less than the first threshold (YES in S34). However, it is acceptable to omit the determination of the auxiliary conditions (S33), and to turn on the timing advance flag when the intake pressure obtained by the intake pressure sensor 18 is determined to be less than the first threshold (YES in S34).

When the engine controller 70 proceeds to "B" in FIG. 8, it obtains various data related to the engine 10 (S50). For example, the engine controller 70 may obtain values such as the value detected by the intake pressure sensor 18 of the intake manifold 32. Note that the obtained data is not limited to the detected value of the intake pressure sensor 18 and may be various data that can be utilized in post processing and the like.

Next, the engine controller 70 determines whether the conditions for executing rapid warm-up are met at this startup (S51). For example, the engine controller 70 may determine that the conditions for rapid warm-up are met when the engine 10 at startup is in a cold state.

If it is determined that the conditions for executing rapid warm-up are met (YES in S51), the engine controller 70 executes rapid warm-up (S52). That is, the engine 10 is warmed up by idling at a relatively high engine speed.

When rapid warm-up is performed (S52), the engine controller 70 determines whether the current time point is substantially the first timing (S53). Note that being substantially the first timing is not limited to a case where the current time point exactly matches the first timing; it may also include a case where the current time point is close to the first timing within a predetermined tolerance range.

If it is determined that the current time point is not substantially the first timing (NO in S53), the engine controller 70 proceeds to the processing in step S80.

If it is determined that the current time point is substantially the first timing (YES in S53), the engine controller 70 calculates a pressure difference between the first threshold and the intake pressure obtained by the intake pressure sensor 18 in step S50 (S54).

For example, the engine controller 70 refers to the current engine speed obtained in step S50 and the first threshold table stored in the memory 62, and reads the first threshold corresponding to the current engine speed obtained in step S50. The engine controller 70 may calculate the pressure difference by subtracting the intake pressure obtained by the intake pressure sensor 18 in step S50 from the read first threshold.

The engine controller 70 sets the timing of fuel injection by the injector 110 based on the calculated pressure difference (S55). That is, the amount by which the timing of injection is advanced is set based on the pressure difference.

The engine controller 70 then executes the timing advance of fuel injection according to the set injection timing (S56).

Next, the engine controller 70 sets a second threshold for the rotational fluctuation of the engine 10 based on the initial learned value for the rotational fluctuation of the engine 10 stored in the memory 62 (S57). For example, the engine controller 70 may set the second threshold by adding a predetermined value representing a tolerance to the initial learned value. Since the initial learned value for the rotational fluctuation is identified for each individual engine 10, the second threshold is also set for each individual engine 10.

After setting the second threshold (S57), the engine controller 70 determines whether the rotational fluctuation at the current time point where the timing advance of fuel injection is being executed exceeds the second threshold (S60). If it is determined that the rotational fluctuation at the current time point where the timing advance of fuel injection is being executed falls below the second threshold (NO in S60), the engine controller 70 proceeds to the processing in step S80.

If it is determined that the rotational fluctuation at the current time point where the timing advance of fuel injection is being executed exceeds the second threshold (YES in S60), the engine controller 70 causes the notification device 22 to notify that the flow of gas inside the cylinder 120 has decreased beyond the allowable range (S61). That is, since it can be inferred that the decrease in the flow of gas inside the cylinder 120 has progressed despite taking measures to advance the fuel injection timing, the notification device 22 is caused to notify, thereby prompting experts to inspect or perform maintenance on the engine 10. After causing the notification device 22 to notify, the engine controller 70 proceeds to the processing in step S80.

Additionally, if it is determined in step S51 that the conditions for executing rapid warm-up are not met (NO in S51), the engine controller 70 performs normal injection control (S70), and proceeds to the processing in step S80. In this case, no rapid warm-up is performed, and normal fuel injection according to the target speed is performed.

In step S80, if the engine controller 70 has received no engine stop instruction (NO in S80), it returns to processing in S50 and repeats the processing.

Upon receiving an engine stop instruction (YES in S80) the engine controller 70 stops the engine 10 (S81) and terminates the current engine control.

Note that, in the above description, as indicated in step S55, the degree of fuel injection timing advance is set according to the pressure difference. However, the degree of fuel injection timing advance may be set to a value prepared in advance. In that case, for example, as in the first threshold table, a timing advance degree table where the engine speed and the degree of fuel injection timing advance are associated may be stored in advance in the memory 62. The engine controller 70 may refer to the current engine speed and the timing advance degree table to set the degree of timing advance.

As described above, in the engine system 1 of the present embodiment, the first threshold, determined by the intake pressure at the first timing during rapid warm-up of the engine 10 in its initial state, is prepared in advance. The first timing of the engine system 1 is included in the period within one cycle of the engine 10, after the intake valve opening timing that represents the timing at which the intake valve 106 changes from a closed state to an open state, and before the piston 104 reaches the bottom dead center. The processor 60 of the engine system 1 obtains the intake pressure at the first timing using the intake pressure sensor 18 while the engine 10 in its current state is being rapidly warmed up. The processor 60 of the engine system 1 determines whether the intake pressure obtained by the intake pressure sensor 18 is less than the first threshold. If the processor 60 of the engine system 1 determines that the intake pressure obtained by the intake pressure sensor 18 is less than the first threshold, it executes a timing advance process to relatively advance the fuel injection timing in the engine 10 according to the pressure difference between the first threshold and the intake pressure obtained by the intake pressure sensor 18.

Accordingly, in the engine system 1 of the present embodiment, it is possible to substantially recognize the occurrence of a reduction in the flow of gas in the cylinder 120 caused by accumulation of deposits on the intake valve 106 and the like. In the engine system 1 of the present embodiment, it is possible to advance the fuel injection timing in response to the occurrence of a reduction in the flow of gas in the cylinder 120 caused by accumulation of deposits on the intake valve 106 and the like. As a result, in the engine system 1 of the present embodiment, even if the flow of gas in the cylinder 120 is reduced, it is possible to have a highly concentrated air-fuel mixture reach the vicinity of the electrode 142 of the spark plug 112 by the time of ignition.

Therefore, according to the engine system 1 of the present embodiment, even if deposits accumulate on the intake valve 106 and the like, it is possible to suppress a reduction in ignitability.

Although the embodiment of the disclosure has been described above with reference to the accompanying drawings, it goes without saying that the disclosure is not limited to the embodiment. It is clear for those skilled in the art to be able to conceive of various changes or modifications within the scope described in the claims, and it is understood that they also naturally fall within the technical scope of the disclosure.

Note that the processes described in this specification do not necessarily need to be executed in the order illustrated in the flowcharts, and may include parallel processing or subroutine-based processing.

According to the disclosure, it is possible to suppress a reduction in ignitability.

The processor 60 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the processor 60 including the engine controller 70. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An engine system comprising:

an engine comprising a piston, a cylinder, an intake valve, and an exhaust valve;

an intake manifold configured to introduce intake air into the engine;

an intake pressure sensor configured to detect intake pressure inside the intake manifold; and a control device configured to control the engine, wherein the control device comprises:

one or more processors; and one or more memories coupled to the one or more processors, a first threshold, determined by the intake pressure at a first timing during rapid warm-up of the engine in an initial state, is prepared in advance, the first timing is included in a period within one cycle of the engine, the period being after an intake valve opening timing that represents a timing at which the intake valve changes from a closed state to an open state, and before the piston reaches a bottom dead center, and the one or more processors execute a process comprising:

obtaining, by the intake pressure sensor, the intake pressure at the first timing during the rapid warm-up of the engine in a current state;

determining whether the intake pressure obtained by the intake pressure sensor is less than the first threshold; and when the intake pressure obtained by the intake pressure sensor is determined to be less than the first threshold, executing a timing advance process to relatively advance a fuel injection timing in the engine according to a pressure difference between the first threshold and the intake pressure obtained by the intake pressure sensor.

2. The engine system according to claim 1, wherein the first timing is included in a period within one cycle of the engine, the period being after the intake valve opening timing, and before the piston reaches a midpoint between a top dead center and a bottom dead center when the piston moves toward the bottom dead center.

3. The engine system according to claim 1, wherein, when valve overlap is performed during the rapid warm-up, the first timing is included in a period within one cycle of the engine, the period being after the intake valve opening timing, after an exhaust valve closing timing that represents a timing at which the exhaust valve changes from an open state to a closed state, and before the piston reaches a bottom dead center.

4. The engine system according to claim 1, wherein:

the one or more processors execute a process comprising executing the timing advance process according to the pressure difference when it is determined that an auxiliary condition is met and that the intake pressure obtained by the intake pressure sensor is less than the first threshold; and the auxiliary condition includes a condition that fuel cut control is currently being executed in the engine, a condition that a water temperature of the engine is greater than or equal to a predetermined temperature, a condition that a speed of the engine is within a predetermined range, and a condition that an EGR valve, which is capable of opening and closing an EGR passage that recirculates part of exhaust gas from the engine back to an intake side of the engine, is in a closed state.

5. The engine system according to claim 1, wherein the one or more processors execute a process comprising:

for each individual engine, identifying a rotational fluctuation of the engine during the rapid warm-up of the engine in the initial state as an initial learned value;

setting a second threshold for the rotational fluctuation of the engine based on the initial learned value;

when executing the timing advance process, determining whether the rotational fluctuation of the engine while the timing advance process is being executed exceeds the second threshold; and when it is determined that the rotational fluctuation of the engine while the timing advance process is being executed exceeds the second threshold, causing a predetermined notification device to notify that flow of gas inside the cylinder has decreased beyond an allowable range.

* * * * *